(12) United States Patent  
Morgan, II

(10) Patent No.: US 6,195,310 B1  
(45) Date of Patent: Feb. 27, 2001

(54) GAME TRAIL MONITORING DEVICE AND METHOD

(76) Inventor: Arch Morgan, II, 30627 N. Willow St., Livingston, LA (US) 70754

( * ) Notice: Subject to any disclaimer, the term of this patent is extended or adjusted under 35 U.S.C. 154(b) by 0 days.

(21) Appl. No.: 09/344,853

(22) Filed: Jun. 28, 1999

(51) Int. Cl.$^7$ .............................. G04B 47/00; G01J 1/02
(52) U.S. Cl. ........................ 368/10; 368/11; 250/338.1; 250/341.1
(58) Field of Search ..................... 368/10.11; 250/338.1, 250/339.14, 341.1

(56) References Cited

U.S. PATENT DOCUMENTS 5,121,367 * 6/1992 Rose .
5,128,548 * 7/1992 Goodson et al. .................. 250/341
5,517,201 * 5/1996 Thompson, Jr. .................. 347/417

* cited by examiner

Primary Examiner—Vit Miska
(74) Attorney, Agent, or Firm—Joseph N. Breaux

(57) ABSTRACT

A monitoring device for assisting hunter's and other person seeking to view animals in the wild along game trails and the intersection of multiple game trails. The monitoring device includes a monitoring assembly for detecting movement of an animal on or along the trail and a speaker used for generating an alerting sound to alert the individual of the approaching animal long before the animal appears. To assist individuals positioned at the intersection of multiple game trails the monitoring device is provided with a selection mechanism for allowing the user to select one sound from a number of different sounds. To prevent the sound from spooking the animal in the wrong direction the speaker is connected to the monitoring assembly by a length of cable greater than twenty feet.

3 Claims, 2 Drawing Sheets

GAME TRAIL MONITORING DEVICE AND METHOD

TECHNICAL FIELD

The present invention relates to game detecting devices and methods and more particularly to a game trail monitoring device that includes a monitor assembly in connection with a speaker assembly by a length of cable; the monitor assembly including a sealed monitor housing having a control circuit housed therein and an infrared detector opening provided therethrough, a two-part monitor assembly attachment strap assembly affixed to the exterior of the sealed monitor housing, a monitor two-position on/off switch, a multi-position animal alert sound select switch for selecting between alert sounds; a multi-position a.m. timer start select switch for selecting an a.m. start time for the monitor; a multi-position p.m. timer stop select switch for selecting a p.m. stop time for the monitor; and an infrared game detector positioned within the sealed monitor housing in a manner to seal the infrared detector opening of the sealed monitor housing; the speaker assembly including a sealed speaker housing having a speaker grate with a speaker positioned there behind; the monitor two-position on/off switch being in controlling connection with the control circuit; the multi-position animal alert sound select switch being in connection with a sound select input of the control circuit; the multi-position a.m. timer start select switch being in connection with an a.m. start time input of the control circuit; the multi-position p.m. timer stop select switch being in connection with a p.m. stop time input of the control circuit; the infrared game detector being in connection with a game animal detection input of the control circuit; the speaker being in connection with a speaker output of the control circuit; the control circuit operating the speaker to produce a sound corresponding with the position of the multi-position animal alert sound select switch upon receiving a game animal detected signal from the infrared game detector on the game animal detection input of the control circuit during a predetermined length period of operation selected to start and stop, respectively, at times set by the user by positioning the multi-position a.m. timer start select and p.m. timer stop select switches. The game trail monitoring method includes the steps of a) providing a game trail monitoring device as described above; b) locating a target spot for waiting for the game animal along a selected game trail; c) positioning the monitor assembly a first distance away from the target spot along the selected game trail in a manner such that the infrared game detector is located such that a detecting zone of the infrared game detector is positioned on the selected game trail to detect movement of an animal along the selected game trail; and d) positioning the speaker assembly a second distance away from the target spot along the selected game trail, the second distance being greater than the first distance such that, should the sound resulting from operation of the speaker when a game animal is detected for the purpose of alerting a user positioned adjacent to the target spook the animal, the animal would tend to flee away from the speaker assembly and toward the target spot.

BACKGROUND ART

Hunter's and other person seeking to view animals in the wild along game trails and the intersection of multiple game trails often miss opportunities because inattention caused by long periods of inaction along the game trail. It would be a benefit to such individuals to have a monitoring device for detecting movement of an animal on or along the trail and generating an alerting sound to alert the individual of the approaching animal long before the animal appears. When the individual is positioned at the intersection of multiple game trails it would be a benefit to have a corresponding number of monitoring devices wherein each monitoring device is adjusted to output a distinctive alerting sound so that the individual knows which trail the animal has been detected on. Because sounds in the woods can spook some animals, it would be a further benefit to have a monitoring device that included a speaker remotely positionable from the detecting mechanism of the monitoring device so that should the alerting sound spook the animal, the position of the speaker would tend to spook the animal toward the individual.

GENERAL SUMMARY DISCUSSION OF INVENTION

It is thus an object of the invention to provide a game trail monitoring device that includes a monitor assembly in connection with a speaker assembly by a length of cable; the monitor assembly including a sealed monitor housing having a control circuit housed therein and an infrared detector opening provided therethrough, a two-part monitor assembly attachment strap assembly affixed to the exterior of the sealed monitor housing, a monitor two-position on/off switch, a multi-position animal alert sound select switch for selecting between alert sounds; a multi-position a.m. timer start select switch for selecting an a.m. start time for the monitor; a multi-position p.m. timer stop select switch for selecting a p.m. stop time for the monitor; and an infrared game detector positioned within the sealed monitor housing in a manner to seal the infrared detector opening of the sealed monitor housing; the speaker assembly including a sealed speaker housing having a speaker grate with a speaker positioned there behind; the monitor two-position on/off switch being in controlling connection with the control circuit; the multi-position animal alert sound select switch being in connection with a sound select input of the control circuit; the multi-position a.m. timer start select switch being in connection with an a.m. start time input of the control circuit; the multi-position p.m. timer stop select switch being in connection with a p.m. stop time input of the control circuit; the infrared game detector being in connection with a game animal detection input of the control circuit; the speaker being in connection with a speaker output of the control circuit; the control circuit operating the speaker to produce a sound corresponding with the position of the multi-position animal alert sound select switch upon receiving a game animal detected signal from the infrared game detector on the game animal detection input of the control circuit during a predetermined length period of operation selected to start and stop, respectively, at times set by the user by positioning the multi-position a.m. timer start select and p.m. timer stop select switches.

It is a further object of the invention to provide a game trail monitoring method that includes the steps of a) providing a game trail monitoring device as described above; b) locating a target spot for waiting for the game animal along a selected game trail; c) positioning the monitor assembly a first distance away from the target spot along the selected game trail in a manner such that the infrared game detector is located such that a detecting zone of the infrared game detector is positioned on the selected game trail to detect movement of an animal along the selected game trail; and d) positioning the speaker assembly a second distance away from the target spot along the selected game trail, the second distance being greater than the first distance such that an animal would tend to flee away from the speaker assembly and toward the target spot should the sound resulting from operation of the speaker when a game animal is detected for the purpose of alerting a user positioned adjacent to the target spook a detected animal.

Accordingly, a game trail monitoring device and method is provided. The game trail monitoring device includes a monitor assembly in connection with a speaker assembly by a length of cable; the monitor assembly including a sealed monitor housing having a control circuit housed therein and an infrared detector opening provided therethrough, a two-part monitor assembly attachment strap assembly affixed to the exterior of the sealed monitor housing, a monitor two-position on/off switch, a multi-position animal alert sound select switch for selecting between alert sounds; a multi-position a.m. timer start select switch for selecting an a.m. start time for the monitor; a multi-position p.m. timer stop select switch for selecting a p.m. stop time for the monitor; and an infrared game detector positioned within the sealed monitor housing in a manner to seal the infrared detector opening of the sealed monitor housing; the speaker assembly including a sealed speaker housing having a speaker grate with a speaker positioned there behind; the monitor two-position on/off switch being in controlling connection with the control circuit; the multi-position animal alert sound select switch being in connection with a sound select input of the control circuit; the multi-position a.m. timer start select switch being in connection with an a.m. start time input of the control circuit; the multi-position p.m. timer stop select switch being in connection with a p.m. stop time input of the control circuit; the infrared game detector being in connection with a game animal detection input of the control circuit; the speaker being in connection with a speaker output of the control circuit; the control circuit operating the speaker to produce a sound corresponding with the position of the multi-position animal alert sound select switch upon receiving a game animal detected signal from the infrared game detector on the game animal detection input of the control circuit during a predetermined length period of operation selected to start and stop, respectively, at times set by the user by positioning the multi-position a.m. timer start select and p.m. timer stop select switches.

The game trail monitoring method includes the steps of a) providing a game trail monitoring device as described above; b) locating a target spot for waiting for the game animal along a selected game trail; c) positioning the monitor assembly a first distance away from the target spot along the selected game trail in a manner such that the infrared game detector is located such that a detecting zone of the infrared game detector is positioned on the selected game trail to detect movement of an animal along the selected game trail; and d) positioning the speaker assembly a second distance away from the target spot along the selected game trail, the second distance being greater than the first distance such that an animal would tend to flee away from the speaker assembly and toward the target spot should the sound resulting from operation of the speaker when a game animal is detected for the purpose of alerting a user positioned adjacent to the target spook a detected animal.

The cable is preferably of a length greater than twenty feet and more preferably of a length of fifty feet or more.

BRIEF DESCRIPTION OF DRAWINGS

For a further understanding of the nature and objects of the present invention, reference should be made to the following detailed description, taken in conjunction with the accompanying drawings in which like elements are given the same or analogous reference numbers and wherein.

EXEMPLARY MODE FOR CARRYING OUT THE INVENTION

Figure 1:
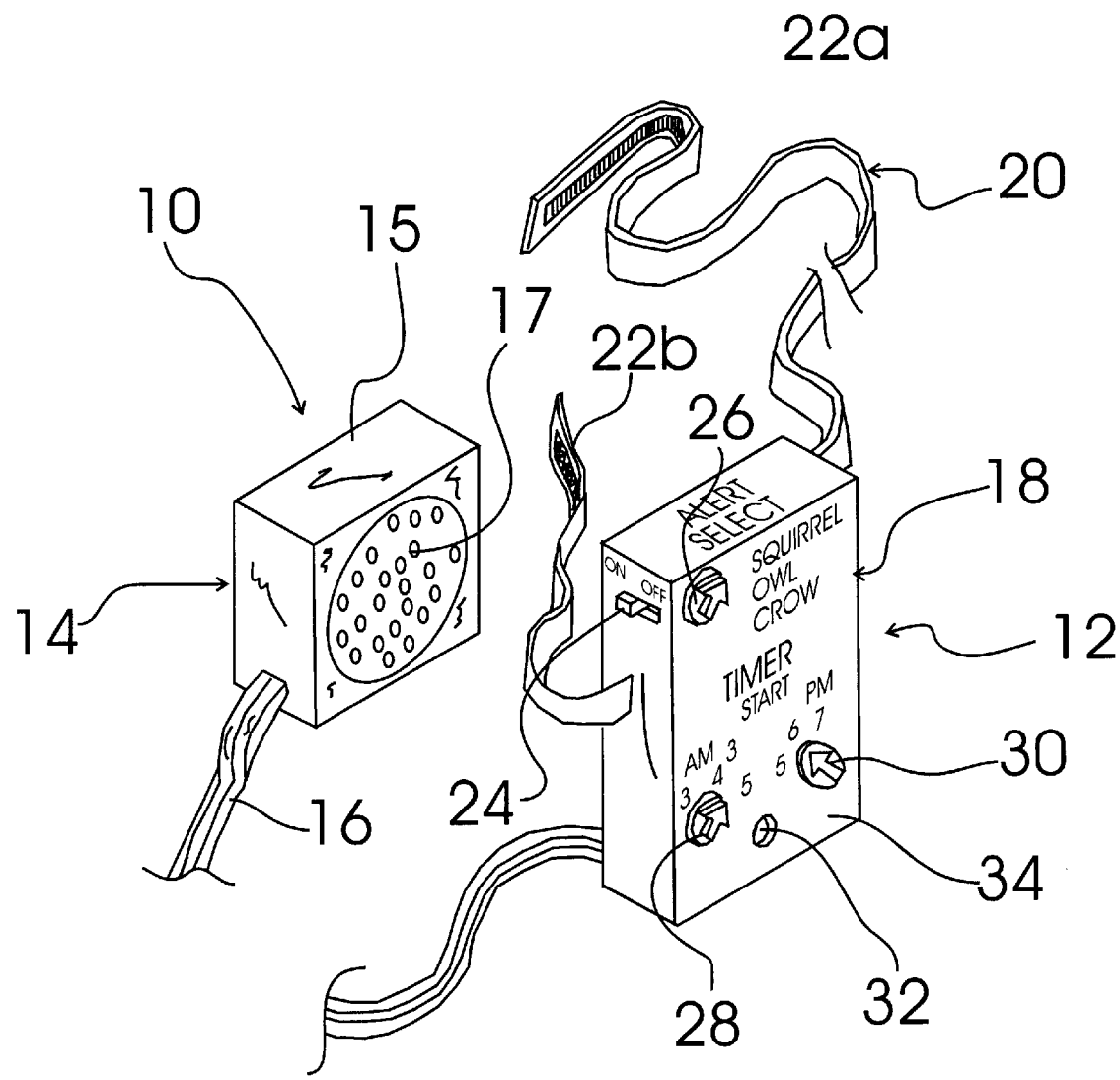
FIG. 1 is a perspective view of an exemplary embodiment of the game trail monitoring device showing the monitor assembly in connection with the speaker assembly by a fifty foot length of two-conductor cable; the monitor assembly including a sealed monitor housing; a two-part monitor assembly attachment strap assembly affixed to the exterior of the sealed monitor housing; a monitor two-position on/off switch; a three-position animal alert sound select switch for selecting between crow, owl and squirrel alert sounds; a three-position a.m. timer start select switch for selecting an a.m. start time for the monitor; a three-position p.m. timer stop select switch for selecting a p.m. stop time for the monitor; and an infrared game detector input opening formed through the front surface of the sealed monitor housing; the speaker assembly including a sealed speaker housing having a speaker grate with a speaker positioned there behind.

FIG. 1 shows an exemplary embodiment of the game trail monitoring device of the present invention, generally designated 10. Monitoring device 10 includes a monitor assembly, generally designated 12; a speaker assembly, generally designated 14; and a fifty foot length of two-conductor cable 16. Speaker assembly 14 includes a sealed speaker housing 15 having a speaker grate 17 behind which a speaker 19 (FIG. 2) is positioned.

Figure 2:
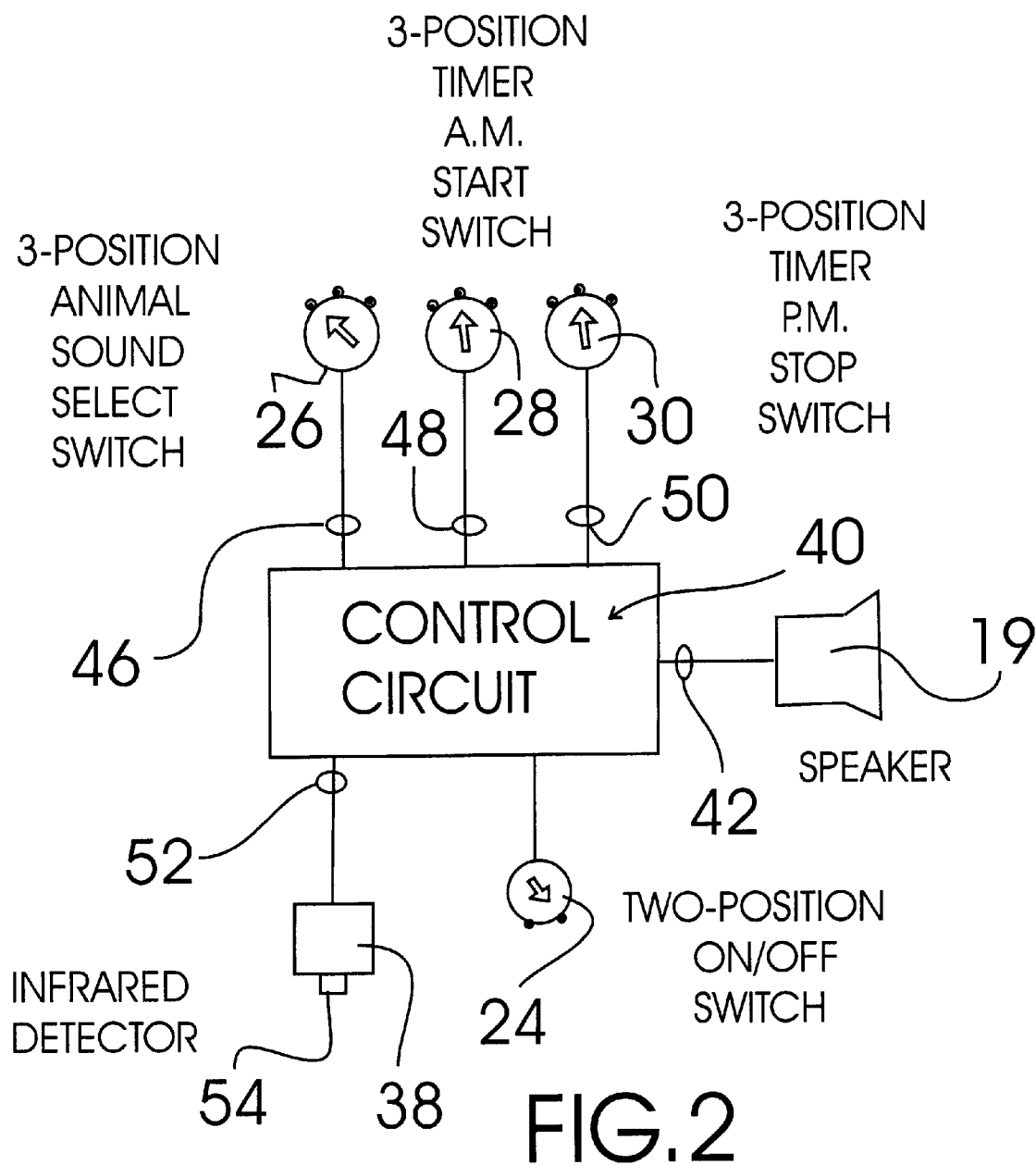
FIG. 2 is a schematic diagram of the exemplary embodiment of the game trail monitoring device of FIG. 1 showing the control circuit; the monitor two-position on/off switch in connection with the control circuit; the three-position animal alert sound select switch for selecting between crow, owl and squirrel alert sounds in connection with a sound select input of the control circuit; the three-position a.m. timer start select switch for selecting an a.m. start time for the monitor in connection with an a.m. start time input of the control circuit; a three-position p.m. timer stop select switch for selecting a p.m. stop time for the monitor in connection with a p.m. stop time input of the control circuit; an infrared game detector in connection with a game animal detection input of the control circuit; and a speaker in connection with a speaker output of the control circuit; the control circuit operating the speaker to produce a sound corresponding with the position of the three-position animal alert sound select switch upon receiving a game animal detected signal from the infrared game detector on the game animal detection input of the control circuit during a predetermined length period of operation selected to start and stop, respectively, at times set by the user using the three position a.m. timer start select and p.m. timer stop select switches.

Monitor assembly 12 includes a sealed, plastic monitor housing, generally designated 18; a two-part monitor assembly attachment strap assembly, generally designated 20, having a first and second strap 22a,22b affixed to the exterior of monitor housing 18; a monitor two-position on/off switch 24; a three-position animal alert sound select rotary switch 26 for selecting between crow, owl and squirrel alert sounds; a three-position a.m. timer start select rotary switch 28 for selecting an a.m. start time for monitor assembly 12; a three-position p.m. timer stop select rotary switch 30 for selecting a p.m. stop time for monitor assembly; an infrared game detector input opening, generally designated 32 formed through front surface 34 of monitor housing 18; referring now to FIG. 2, an infrared game detector, generally designated 38, positioned behind infrared game detector input opening 32 (FIG. 1) in a manner to seal opening 32; and a programmable control circuit, generally designated 40.

Speaker 19 is in connection with a speaker output 42 of control circuit 40. Monitor two-position on/off switch 24 is in controlling connection with control circuit 40. Three-position animal alert sound select switch 26 is for selecting between crow, owl and squirrel alert sounds is in connection with a sound select input 46 of control circuit 40. Three-position a.m. timer start select switch 28 is for selecting an a.m. start time for the monitor assembly 12 (FIG. 1) and is in connection with an a.m. start time input 48 of control circuit 40. Three-position p.m. timer stop select switch 30 is for selecting a p.m. stop time for monitor assembly 12 (FIG. 1) and is in connection with a p.m. stop time input 50 50 of control circuit 40. Infrared game detector 38 is in connection with a game animal detection input 52 of control circuit 40 and has an infrared detector for detecting the presence of infrared light in a detection zone extending out in front of a detector input structure 54. In this embodiment detector 54 is positioned behind infrared game detector input opening 32 (FIG. 1) in a manner to seal opening 32.

In operation, control circuit 40 operates speaker 19 to produce a sound corresponding with the position of three-position animal alert sound select switch 26 upon receiving a game animal detected signal from infrared game detector 38 on game animal detection input 52 of during a period of operation selected to start and stop, respectively, at times set by the user using the a.m. three-position timer start select and p.m. three-position timer stop select switches 28,30.

An exemplary method of the invention includes the steps of a) locating the intersection of a first and a second game trail; b) providing a first and a second monitor device 10a,10b as described above; c) positioning the monitor assembly 12a at a location along the first game trail a distance of about three hundred feet from the intersection of the first and the second game trail such that a desired game animal must cross the detecting zone of the infrared game detector 38a of the monitor assembly 12a, positioning three-position animal sound select switch 26a on a first animal sound position, and positioning the speaker assembly 14a a distance of about 340 feet from the intersection of the first and the second game trail; d) positioning the monitor assembly 12b at a location along the second game trail a distance of about three hundred feet from the intersection of the first and the second game trail such that a desired game animal must cross the detecting zone of the infrared game detector 38b of the monitor assembly 12b, positioning three-position animal sound select switch 26b on a second animal sound position different from the first animal sound position, and positioning the speaker assembly 14b a distance of about 340 feet from the intersection of the first and the second game trail.

It can be seen from the preceding description that a game trail monitoring device and method has been provided wherein the game trail monitoring device includes a monitor assembly in connection with a speaker assembly by a length of cable; the monitor assembly including a sealed monitor housing having a control circuit housed therein and an infrared detector opening provided therethrough, a two-part monitor assembly attachment strap assembly affixed to the exterior of the sealed monitor housing, a monitor two-position on/off switch, a multi-position animal alert sound select switch for selecting between alert sounds; a multi-position a.m. timer start select switch for selecting an a.m. start time for the monitor; a multi-position p.m. timer stop select switch for selecting a p.m. stop time for the monitor; and an infrared game detector positioned within the sealed monitor housing in a manner to seal the infrared detector opening of the sealed monitor housing; the speaker assembly including a sealed speaker housing having a speaker grate with a speaker positioned there behind; the monitor two-position on/off switch being in controlling connection with the control circuit; the multi-position animal alert sound select switch being in connection with a sound select input of the control circuit; the multi-position a.m. timer start select switch being in connection with an a.m. start time input of the control circuit; the multi-position p.m. timer stop select switch being in connection with a p.m. stop time input of the control circuit; the infrared game detector being in connection with a game animal detection input of the control circuit; the speaker being in connection with a speaker output of the control circuit; the control circuit operating the speaker to produce a sound corresponding with the position of the multi-position animal alert sound select switch upon receiving a game animal detected signal from the infrared game detector on the game animal detection input of the control circuit during a predetermined length period of operation selected to start and stop, respectively, at times set by the user by positioning the multi-position a.m. timer start select and p.m. timer stop select switches; and wherein the game trail monitoring method includes the steps of a) providing a game trail monitoring device as described above; b) locating a target spot for waiting for the game animal along a selected game trail; c) positioning the monitor assembly a first distance away from the target spot along the selected game trail in a manner such that the infrared game detector is located such that a detecting zone of the infrared game detector is positioned on the selected game trail to detect movement of an animal along the selected game trail; and d) positioning the speaker assembly a second distance away from the target spot along the selected game trail, the second distance being greater than the first distance such that an animal would tend to flee away from the speaker assembly and toward the target spot should the sound resulting from operation of the speaker when a game animal is detected for the purpose of alerting a user positioned adjacent to the target spook a detected animal.

It is noted that the embodiment of the game trail monitoring device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A game trail monitoring device comprising:

a monitor assembly;

a speaker assembly; and a length of cable in connection between said monitor assembly and said speaker assembly;

said monitor assembly including a monitor housing having a control circuit housed therein, and an infrared detector opening provided therethrough, a two-part monitor assembly attachment strap assembly affixed to an exterior of said monitor housing; a monitor two-position on/off switch; a multi-position animal alert sound select switch for selecting between alert sounds; and an infrared game detector positioned within said monitor housing in a manner to seal said infrared detector opening of said monitor housing;

said speaker assembly including a sealed speaker housing having a speaker grate with a speaker positioned there behind;

said monitor two-position on/off switch being in controlling connection with said control circuit;

said multi-position animal alert sound select switch being in connection with a sound select input of said control circuit;

said infrared game detector being in connection with a game animal detection input of said control circuit;

said speaker being in connection with a speaker output of said control circuit;

said control circuit operating said speaker to produce a sound corresponding with a user set position of said multi-position animal alert sound select switch upon receiving a game animal detected signal from said infrared game detector on said game animal detection input of said control circuit.

2. The game trail monitoring device of claim 1 further comprising:

a multi-position a.m. timer start select switch for selecting an a.m. start time for said monitor control assembly; and a multi-position p.m. timer stop select switch for selecting a p.m. stop time for said monitor assembly;

said multi-position a.m. timer start select switch being in connection with an a.m. start time input of said control circuit;

said multi-position p.m. timer stop select switch being in connection with a p.m. stop time input of said control circuit;

said monitor assembly being operational during a predetermined length period of operation selected to start and stop, respectively, at times set by a user by positioning said multi-position a.m. timer start select and p.m. timer stop select switches.

3. A game trail monitoring method comprising the steps of:

a) providing a game trail monitoring device comprising:
a monitor assembly;
a speaker assembly; and
a length of cable in connection between said monitor assembly and said speaker assembly;

said monitor assembly including a monitor housing having a control circuit housed therein, and an infrared detector opening provided therethrough, a two-part monitor assembly attachment strap assembly affixed to an exterior of said monitor housing; a monitor two-position on/off switch; and an infrared game detector positioned within said monitor housing in a manner to seal said infrared detector opening of said monitor housing;

said speaker assembly including a sealed speaker housing having a speaker grate with a speaker positioned there behind;

said monitor two-position on/off switch being in controlling connection with said control circuit;

said multi-position animal alert sound select switch being in connection with a sound select input of said control circuit;

said infrared game detector being in connection with a game animal detection input of said control circuit;

said speaker being in connection with a speaker output of said control circuit;

said control circuit operating said speaker to produce a sound corresponding with a user set position of said multi-position animal alert sound select switch upon receiving a game animal detected signal from said infrared game detector on said game animal detection input of said control circuit;

b) locating a target spot for waiting for the game animal along a selected game trail;

c) positioning the monitor assembly a first distance away from the target spot along the selected game trail in a manner such that the infrared game detector is located such that a detecting zone of the infrared game detector is positioned on the selected game trail to detect movement of an animal along the selected game trail; and d) positioning the speaker assembly a second distance away from the target spot along the selected game trail, the second distance being greater than the first distance such that an animal would tend to flee away from the speaker assembly and toward the target spot should the sound resulting from operation of the speaker when a game animal is detected for the purpose of alerting a user positioned adjacent to the target spook a detected animal.

\* \* \* \* \*